United States Patent

[11] 3,573,354

[72] Inventor Paul R. Ahrens
Indianapolis, Ind.
[21] Appl. No. 731,037
[22] Filed May 22, 1968
[45] Patented Apr. 6, 1971
[73] Assignee RCA Corporation

[54] COLOR KILLER AND A. C. C. CIRCUITS
11 Claims, 5 Drawing Figs.

[52] U.S. Cl. .................................................... 178/5.4
[51] Int. Cl. .................................................... H04n 9/48
[50] Field of Search .......................................... 178/5.4, 5.4 (ACC), 5.4 (CK)

[56] References Cited

UNITED STATES PATENTS 2,961,484 11/1960 Macovski ..................... 178/5.4(CK)
2,975,231 3/1961 Rhodes ......................... 178/5.4(CK)
3,135,825 6/1964 Moles et al. ................... 178/5.4(CK)
3,272,915 9/1966 Theriault ...................... 178/5.4(ACC)

*Primary Examiner*—Richard Murray
*Attorney*—Eugene M. Whitacre

ABSTRACT: Color killer action is provided in a color television receiver in response to the output of a burst amplitude detector, through use of a DC amplifier, which operates in a high gain mode for detector outputs below a threshold value, and in a reduced gain mode for detector outputs above the threshold value. The two-mode DC amplifier includes at least one transistor having separate output circuits coupled to its emitter and collector electrodes, with control information for ACC purposes taken from one output circuit, and kill control responsive to the other output circuit. When ACC action is in effect, interference from killer circuit is precluded or reduced to a tolerable degree as a result of amplifier mode shift. Optional arrangements are disclosed that permit setting a threshold for initiation of ACC action that is independent of killer threshold.

INVENTOR
Paul R. Ahrens
BY Eugene M. Whitacre
ATTORNEY

INVENTOR
Paul R. Ahrens

BY Eugene M. Whitacre

ATTORNEY

COLOR KILLER AND A. C. C. CIRCUITS

The present invention relates to television receivers and more particularly to improved automatic chroma control and color killer circuits for color television receivers.

Color television systems presently utilized employ a composite video signal which includes a luminance and a chrominance component. The luminance component, sometimes referred to as the Y component, is of the same general type as that employed in black and white television systems and has a frequency band extending from a relatively low frequency to about 4 MHz. The chrominance component consisting of a modulated color subcarrier wave occupies a smaller frequency band located at the higher end of the luminance component frequency band.

The difference in frequency bands between the luminance and chrominance components may, at a given receiving location, result in the relative amplitudes of the two composite video components being changed when the composite signal is transmitted over the air because frequency selective attenuation may exist in the transmission path. Such a change in relative amplitudes of the luminance and chrominance components may result in the reproduction of a color image with color and contrast values which are not optimum.

As transmitted, the composite color television signal has, in addition to the luminance and chrominance components previously mentioned, horizontal deflection synchronizing pulses and color synchronizing bursts of the color subcarrier wave. The color synchronizing bursts are used in the receiver to synchronize the demodulation of the transmitted color subcarrier signal; these bursts are transmitted on the "back porch" of the horizontal synchronizing pulses.

A color television receiver may include either automatic chroma control circuits or color killer circuits or both. An automatic chroma control circuit opposes spurious changes in amplitude of the chrominance component relative to the amplitude of the luminance component (which, if uncorrected, would introduce saturation errors in the reproduced picture). A color killer circuit serves to disable the color signal processing circuitry of the receiver during monochrome signal reception. Its operation prevents spurious information, which might be developed by higher frequency components of the monochrome signal in the chrominance channels during monochrome transmission, from being applied to the color image reproducer.

Color killer action relies on information relating to the presence or absence of the bursts, while automatic chroma control action typically relies upon information relating to the amplitude of the color synchronizing bursts, when present.

The color synchronizing bursts, as transmitted are of unvarying amplitude (in contrast with the chrominance component which varies in amplitude with picture information); variations in received burst amplitude, accordingly can be relied upon to reflect spurious variations in the chrominance component to the exclusion of the desired variations thereof.

Color killer and ACC circuits desirably should be positive acting circuits, while involving a small number of circuit components so that the cost of the receiver is not unduly increased. Since the color killer circuit operates to disable the chrominance channel when synchronizing bursts are not present and the ACC circuit tries to increase the gain of the chrominance channel for decreasing burst amplitude, careful consideration has to be given to such circuits so that during color operation they do not work at cross purposes to an intolerable degree. In this regard, it is advantageous to effectively and reliably isolate the ACC and killer thresholds so that they may be individually determined to assure proper noninterfering operation.

In accordance with the principles of the present invention, a single burst amplitude detector is relied upon as a source of control information for both color killer and automatic chroma control purposes. Killer control information is derived from the output of the burst detector through use of a DC amplifier, which operates in a high gain mode for detector outputs below a threshold value, and in a reduced gain mode for detector outputs above the threshold value.

By use of the two-mode technique, a control circuit, providing high sensitivity killer action for the region of detector output levels where discrimination between color and monochrome operation of the receiver is called for, is shifted to a low sensitivity state for higher detector output levels; the tendency of killer circuitry to oppose or otherwise interfere with ACC action during color operation is thereby minimized without compromising positive-acting killer performance.

The two-mode DC amplifier includes a signal translating device having first and second output electrodes. An output circuit coupled to one of these output electrodes is associated with the DC amplification of the killer control voltage, while a separate output circuit is associated with the other output electrode of the device for takeoff control information for ACC purposes. A network associated with one of these output circuits is used to determine the killer threshold level referred to above.

In accordance with one embodiment of the present invention, the DC amplifier for killer control voltage development includes a pair of transistors, with one of the transistors disposed in a common emitter arrangement and supplying its output to the base of the second transistor, the latter arranged to provide a killer control output at its emitter electrode. A voltage divider, establishing collector bias for the second transistor, determines the killer threshold (i.e., the burst detector output level below which the DC amplifier operates in a high gain mode, and above which the DC amplifier operates in a reduced gain mode). For low detector output levels, the base-collector path of the second transistor is reverse biased, and transistor action occurs in the second transistor, which serves as an emitter follower stage for killer control voltage development. However, above the threshold level, the base of the second transistor becomes forward biased with respect to the collector thereof; transistor action for the second transistor is lost in this mode; and the transistor behaves as a pair of forward biased diodes. Under these circumstances the collector load of the input stage drops drastically in impedance value and a substantially reduced killer amplifier gain is a result. In this embodiment, the collector of the second transistor provides a convenient takeoff point for automatic chroma control information.

In accordance with a variation of the two-stage DC amplifier embodiment above described, a common emitter input stage again directly drives the base of a second stage providing a killer control voltage at its emitter electrode, but killer threshold determination is associated with the biasing of the base-to-emitter path of the second stage. In this case, the shift from low gain mode to high gain mode for the killer control DC amplifier is effected when the voltage at the base of the second stage reverse biases the base-emitter path of the second stage, driving the transistor to cut off. In this embodiment, the emitter electrode of the input transistor serves as the take off point for ACC control information.

In contrast with the two-stage DC amplifier versions of the invention described above, a further embodiment is contemplated wherein a single-stage DC amplifier is employed for killer control voltage development. The collector circuit of the single DC amplifying stage provides the killer control voltage. The killer threshold level is determined by a network associated with the collector circuit, and incorporating a normally reverse biased diode. In this variation, shift from the high gain mode to the reduced gain mode is effected when the burst detector output rises to a level sufficient to forward bias the diode, altering the collector load of the transistor amplifier in a direction to appreciably reduce the gain of the stage. In this embodiment, the emitter electrode of the single stage serves as the ACC takeoff point.

In the first of the invention embodiments above described, the threshold for initiation of ACC action is not independent of the killer threshold. Where such independence is sought, the second and third embodiments described above are particularly advantageous. For example, an additional transistor amplifier may be coupled to the ACC takeoff point in those previously described circuits. An ACC threshold may be set (at a level of burst detector output different from the killer threshold value) by a biasing network associated with the input of the additional ACC transistor, the network serving to hold the additional transistor cutoff until a predetermined burst detector output level is reached.

It is an object of the present invention to provide improved circuitry for performing automatic chroma control and color killer functions.

It is a particular object of the present invention to provide a color television receiver with arrangements for reducing conflicts in the effects of circuits performing automatic chroma control and color killer functions.

For a clearer understanding of the present invention, reference may be had to the following specification given in connection with the accompanying drawings, wherein.

Figure 1:
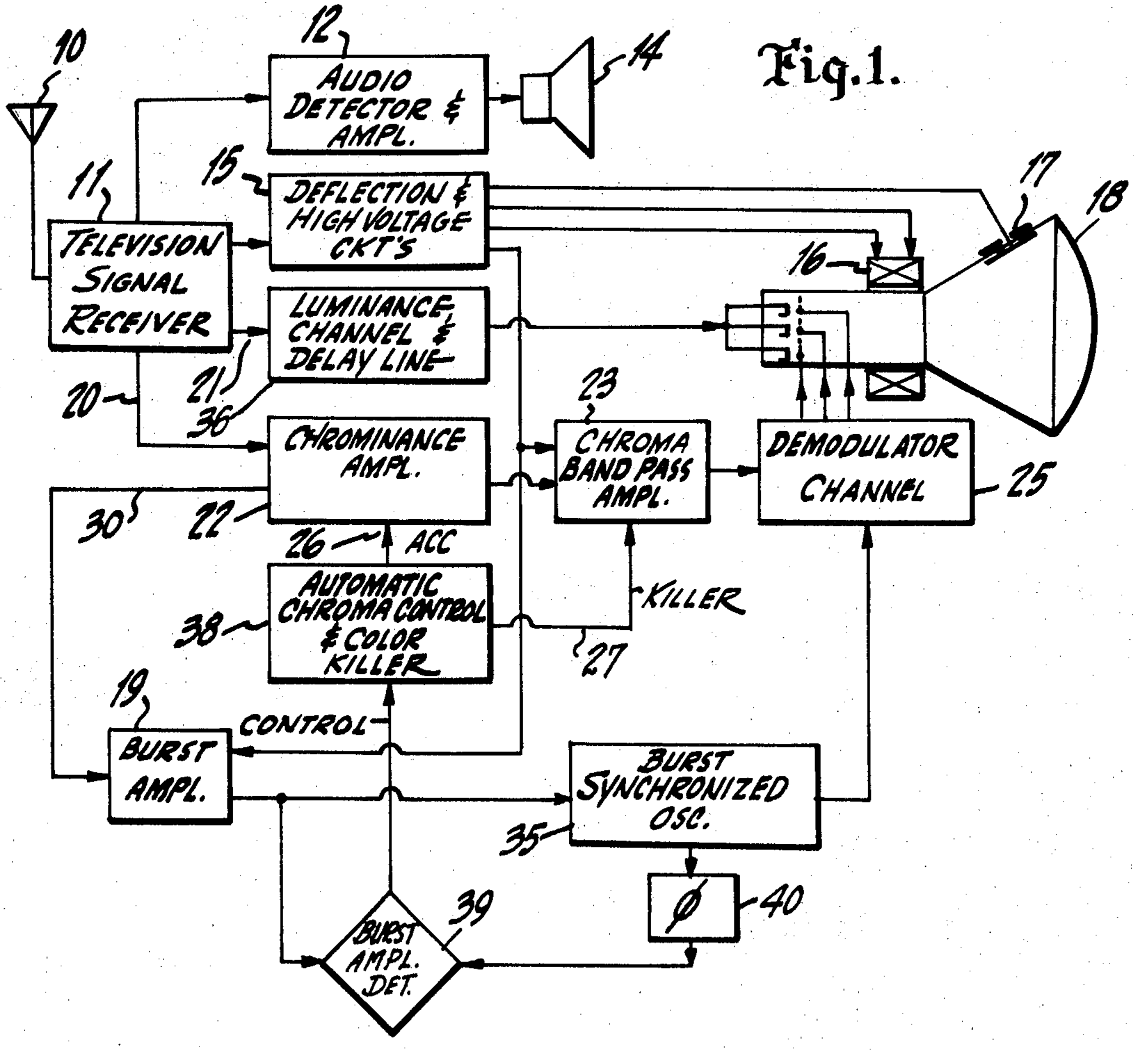
FIG. 1 is a circuit diagram in block form of a color television receiver.

Referring now to FIG. 1, an antenna 10 is coupled to the input terminals of a television signal receiver 11. The portion of the receiver included in the rectangle 11 includes the tuner, intermediate frequency amplifier, video detector and intercarrier sound detector.

The intercarrier sound detector provides a 4.5 MHz intercarrier sound wave which is amplified and detected in the sound channel 12. The recovered audio frequency sound signal is amplified and applied to a loudspeaker 14.

The demodulated video signal from the video detector is applied to the deflection and high voltage circuit 15. The synchronizing pulse components of the video signal are used to control horizontal and vertical deflection generators. Vertical and horizontal deflection signals developed by the deflection generators are applied to the deflection yoke 16; and a high voltage developed from the horizontal retrace pulse is applied to the ultor 17 of the color kinescope 18, which may be a three-electron-gun shadow mask tube. The deflection and high voltage circuit 15 also produces pulses at the horizontal rate and of a suitable phase and polarity to gate a burst amplifier 19, and to block the passage of the color burst through a band-pass amplifier 23. The gating pulses for the burst amplifier 19 may be provided by an auxiliary winding on the horizontal deflection output transformer associated with the deflection and high voltage circuits 15.

The composite video signal is applied by way of a conductor 20 to a chroma amplifier 22 which is coupled to a chroma band-pass amplifier 23 for further amplification and application to the demodulation channel 25. The chrominance sidebands occupies a range of frequencies from 2 to 4.2 MHz. The chrominance amplifier 22 has a gain control terminal 26 to which an automatic chroma control voltage may be applied to control the amplification or gain of the chrominance amplifier channel 22.

The chrominance amplifier 22 also applies the chrominance signal to the burst amplifier 19 by means of a conductor 30. The burst amplifier 19 is keyed by a gate pulse from the deflection and high voltage circuit 15 to separate the color synchronizing bursts from the remainder of a received color television signal. The separated bursts are applied to a burst synchronized oscillator 35 to control the frequency and phase of the resultant oscillator signal.

The burst synchronized oscillator 35 provides a phased-locked 3.58 MHz signal which is applied to the demodulation channel 35. The oscillator 35 signal is suitably phase shifted to enable demodulation of at least two color difference signals contained in the chrominance signal. R-Y, B-Y and G-Y color difference signals obtained from the demodulation channel 35 are applied to corresponding control electrodes of the color kinescope 18.

The demodulated video signal is also applied by way of the luminance channel and delay line 36 to the cathodes of the color kinescope 18.

An automatic chroma control and color killer circuit 38 provides a pair of output control voltages which are applied respectively to the chrominance amplifier 22 and to the band-pass amplifier 23 (via the respective leads 26 and 27). The control voltages from the circuit 38 are derived in response to a voltage from a burst amplitude detector 39. Preferably, the burst amplitude is detected synchronously, with the detector 39 thus receiving, in addition to the output of the burst amplifier 19, an input from the burst synchronized oscillator 35, which is coupled to the detector 39 through a phase shift circuit 40 to establish in-phase detection of the burst when the oscillator is properly synchronized.

During color transmissions, the output voltage applied via lead 26 is used to vary the gain of the chrominance amplifier 22 as a function of the burst amplitude. The chrominance amplifier 22 will be controlled by the ACC action to provide an output substantially free of spurious amplitude variations. During monochrome transmissions, the output voltage applied via lead 27 is used to disable the band-pass amplifier 23.

Figure 2:
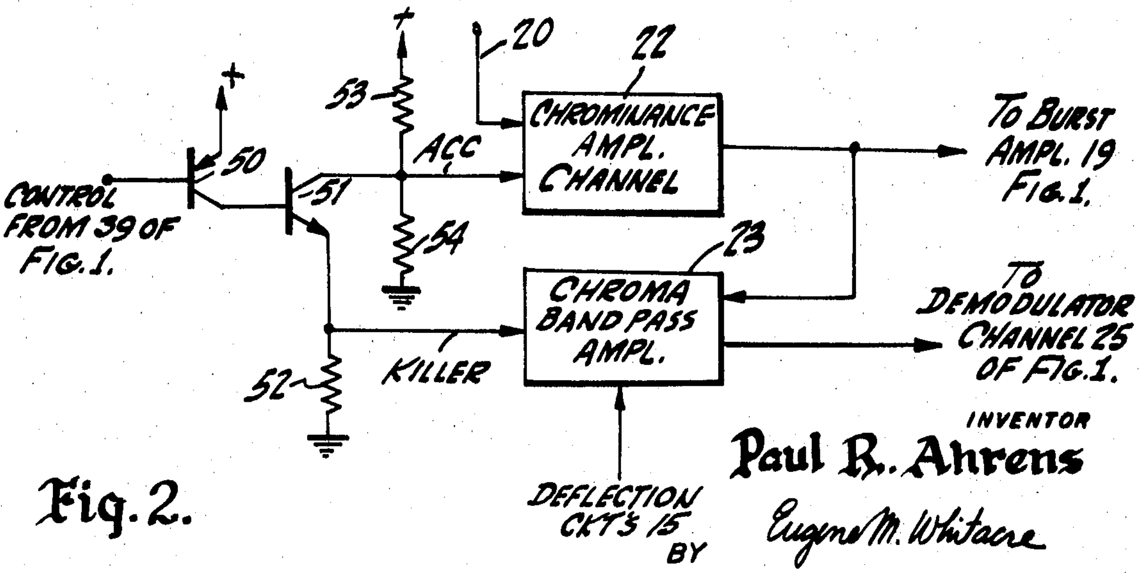
FIGS. 2, 3, 4 and 5 are schematic circuit diagrams of various automatic chroma control and color killer circuits embodying the present invention.

FIG. 2 is a schematic circuit diagram of a chroma control and color killer circuit which can be used for the circuit 38 of FIG. 1.

A transistor 50 has a base electrode coupled to the output terminal of the burst amplitude detector 39 of FIG. 1. The emitter electrode of the transistor 50 is coupled to the positive terminal of a source of potential. The collector electrode is direct coupled to the base electrode of an opposite conductivity type transistor 51, having its emitter electrode returned to a source of reference potential, such as ground, through a resistor 52. The voltage developed across the resistor 32 is a color killer voltage which is applied to the band-pass amplifier 23, and will "kill" or cut off the amplifier 23 in the absence of the color burst. The band-pass amplifier 23 may be a transistor stage having a tuned circuit associated with its collector electrode.

The collector electrode of transistor 51 is coupled to the junction of a voltage divider comprising resistors 53 and 54 connected between the positive terminal of a direct potential source and ground. The voltage division is chosen such that for low levels of burst detector output the base-collector junction of transistor 51 is reverse biased (with ensuing transistor action obtained in transistor 51), whereas for higher levels of burst detector output, the base-collector junction of transistor 51 is forward biased. The voltage at the collector electrode of transistor 51 serves as an automatic chroma control voltage which is applied to the chrominance amplifier 22.

The operation of the circuit of FIG. 2 is as follows: For a first range of burst detector output voltages (indicative of zero or low amplitude bursts), the base-collector junction of transistor 51 remains reverse biased, transistor action is obtained in transistor 51, and transistors 50 and 51 provide a high gain two-stage DC amplifier of the detector output for kill/unkill control of the band-pass amplifier 23. However, when the burst amplitude rises sufficiently to forward bias the base-collector junction of transistor 51, transistor action is lost in transistor 51, which thereupon appears as a pair of forwardly biased diodes. Under the latter condition the load presented to the collector of transistor 50 is significantly reduced, with a consequent reduction in gain of the DC amplifier for killer control purposes. By way of example it may be noted that in one working embodiment, the reduction was from a gain of the order of 250 to 300 to a gain of the order of 3 to 3.5.

For the range of detector output voltage above that which accomplishes the forward biasing of the base-collector junction of transistor 51, the voltage at the collector of transistor 51 directly follows (without polarity inversion) the changes at the collector of transistor 50. These followed changes are applied to the chrominance amplifier 22 to adjust its gain for automatic chroma control purposes. The control action is such that increases in burst amplitude will produce a gain reduction in chrominance amplifier 22 that tends to oppose the burst amplitude increase, and vice versa.

When the receiver is operating in a mode where ACC action is desired, the killer circuitry will tend to operate in a direction opposing the ACC corrective action. However, with the killer DC amplifier shifted to a low gain mode, the killer circuit interference with correction by ACC action may be kept to a small effect. This is particularly possible where the ACC system is of the closed loop type shown in FIG. 1, where the ACC action itself restricts the swing in burst amplitude detector output level.

When operating at burst amplitude detector output levels below that sufficient to forward bias the collector junction of transistor 51, the output at the collector of transistor 51 will follow in a polarity inverted fashion the output at the collector of transistor 50. Application of such variations to the chrominance amplifier 22 will not provide ACC action. However, this effect will occur at levels of detector output when ACC action is not required; i.e. it will exist for detector output levels necessitating killing of the band-pass amplifier 23, or for low burst levels above that condition where no gain reduction in chrominance amplifier 22 is desired.

Although the circuit shown in FIG. 2 will operate successfully for certain amplitude ranges of the burst signals, it has certain disadvantages for particular applications. First, as described above, there is a voltage change across the emitter resistor 52 during the ACC mode and for certain band-pass amplifiers not properly compensated such changes might tend to shift the operating point of the amplifier 23 to an undesired degree. Secondly, it becomes difficult to independently adjust the ACC threshold without disturbing to some degree the killer circuit operation and the quiescent biasing of the chrominance amplifier 22.

Figure 3:
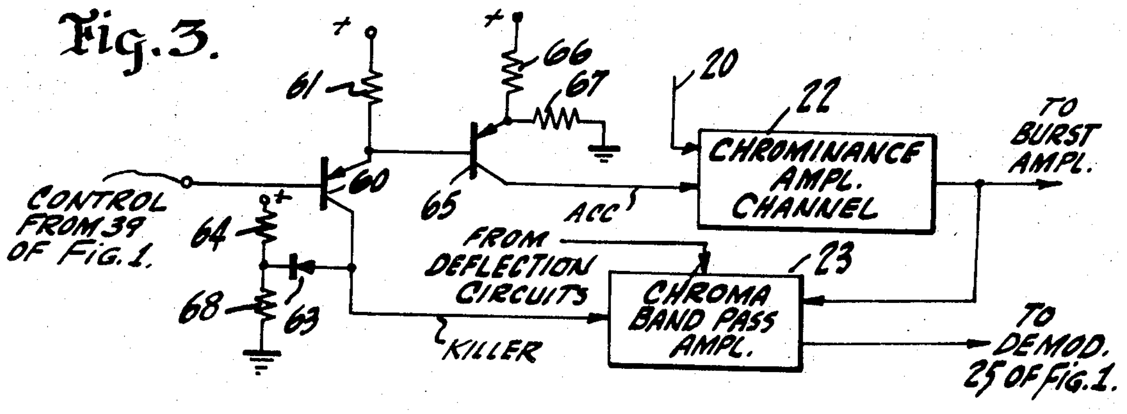

FIG. 3 shows another version of a combination ACC and color killer circuit which enables independent ACC threshold adjustment for operation over a wider range of higher amplitude burst signal levels than that of FIG. 1. A transistor 60 has its emitter electrode coupled to a point of reference potential through a resistor 61. The junction between the emitter of transistor 60 and the resistor 61 is coupled to the base of an ACC transistor 65, having its emitter coupled to the junction of a pair of resistors 66 and 67. Resistors 66 and 67 are coupled between the positive terminal of potential source and ground. The collector of transistor 65 is coupled to the input, as a base electrode, of a transistor amplifier in the chrominance channel 22 for ACC control. The collector electrode of transistor 60 is coupled to a base electrode or an input electrode of a transistor amplifier in the band-pass amplifier 23 for killer control, and is further coupled to the junction between resistors 64 and 68 by means of a diode 63 having its anode coupled to the collector of transistor 60. The resistors 64 and 65 are coupled between a point of positive potential and ground. Transistor 60 as biased operated as a common collector stage or emitter follower for the ACC range and as a common emitter amplifier for developing color killer voltages.

As the level of the burst increases the voltage at the base electrode of transistor 60 becomes more negative. This in turn causes the voltage at the base electrode of transistor 65 to go more negative. When the potential at the base electrode of transistor 65 reaches the potential at its emitter electrode, determined by the threshold voltage, according to the magnitude of resistors 66 and 67, the base-to-emitter junction of transistor 65 becomes forward biased. This potential defines the point where ACC action starts and therefore the magnitude of the resistors 66 and 67 may be selected to independently determine the threshold for initiating ACC action as applied to the chrominance amplifier 22.

As in the circuit of FIG. 2, the DC amplification of the burst detector output for killer purposes is provided in two-mode fashion (i.e., a high gain mode for low levels of burst detector output, and a reduced gain mode for higher levels of burst detector output). However, in contrast with FIG. 2, the level at which this mode shift takes place is determined independently of threshold determination for initiation of ACC action. In particular, the level is determined by the voltage divider 64, 68 which biases the cathode of diode 63, and the mode shift takes place when the burst detector output level rises sufficiently to forward bias the diode 63. When this occurs the collector of transistor 60 sees a relatively low impedance, primarily determined by the parallel combination of resistors 64 and 68, and DC gain of the amplifier is low whereby the bias supplied to band-pass amplifier 23 remains relatively constant (as desired to prevent opposition to ACC action).

On the other hand, when the burst detector output level is sufficiently low that diode 63 is reverse biased, resistors 64 and 68 are effectively out of circuit due to the nonconduction of diode 63, and the collector of transistor 60 sees a relatively high load impedance (as determined by the input circuit of band-pass amplifier 23); this permits high gain DC amplification for the range of detector output levels where kill/unkill discrimination is desired.

The killer circuit shown in FIG. 3, presents a relatively high impedance to the input to the band-pass amplifier 23 when compared to that offered by the circuit in FIG. 2. Effects of this impedance level difference may be significant when (as in the illustrated arrangements) the band-pass amplifier input also receives a burst elimination pulse.

Burst elimination is employed in many color receivers to assure that the synchronizing burst in the signal delivered to the chrominance amplifier is not coupled for the demodulation channel. The elimination of the burst from the chrominance signal input to the demodulator channel (25 of FIG. 1) is desirable from many aspects. In one case appearance of a demodulated burst in the demodulator channel's output may lead to the appearance and coloring of retrace lines on the face of the kinescope (18 of FIG. 1); additionally, appearance of the demodulated burst in the demodulator outputs may disturb operation in subsequent color processing circuitry. Accordingly, in the FIG. 1 receiver arrangement, the burst is eliminated from the band-pass amplifier 22 and hence the demodulator channel, by gating the band-pass amplifier 22 off with a suitable polarity pulse derived from the deflection circuits. For examples of such systems, see U.S. Pat. No. 3,251,931, entitled "Color Television Receiver Kinescope Master Bias Arrangement," issued to T. C. Jobe, et al. on May 17, 1966.

Where the killer circuit of FIG. 3 is employed, an advantage of the relatively high impedance it presents to the input of band-pass amplifier is a reduced energy requirement for the burst elimination pulse. However, while the pulse energy supplied to the band-pass amplifier 23 may be low for the circuit of FIG. 3, the time constant associated with the fall time of this pulse tends to be longer, because of the higher impedance circuit. This in turn, may cause the band-pass amplifier 23, to remain cutoff for an initial portion of the next television line, because of the long time constant, thereby preventing rapid recovery of this circuit after burst elimination.

Figures 4, 5:
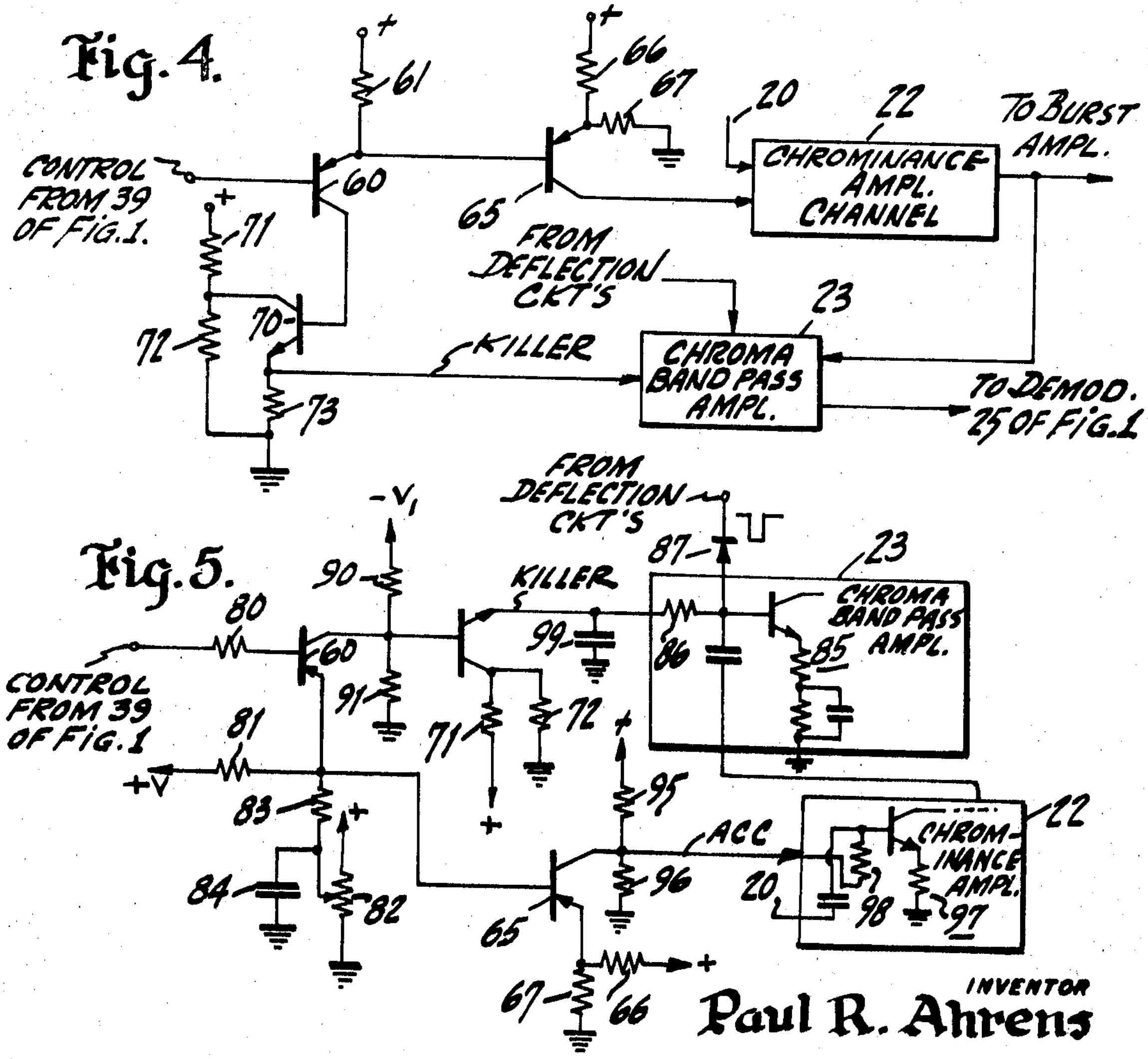

FIG. 4 illustrates a modification of the previously described circuits wherein the threshold independence advantages of the FIG. 3 circuit are obtained with a reduced killer circuit impedance level (permitting rapid recovery of the band-pass amplifier after burst elimination). In FIG. 4 the diode 63 of FIG. 3 is replaced by a transistor 70, whose base electrode is coupled to the collector electrode of transistor 60. In this circuit the emitter electrode of transistor 70 is coupled to a point of reference potential such as ground, through emitter resistor 73. The emitter electrode is coupled to the input of the band-pass amplifier 23 for killer action. The band-pass bias is obtained by selection of resistors 71 and 72 coupled between a point of potential and ground and having the junction thereof coupled to the collector of transistor 70. The ACC action is furnished similar to that as described in FIG. 3, and hence the same circuit component reference numerals are retained. In this circuit, bias for the input or base electrode of the band-pass amplifier 23 is supplied via the emitter of transistor 70 which remains at a relatively constant voltage during the ACC mode of the circuit as described above for FIG. 3. When the base-to-emitter junction of transistor 70 becomes reverse biased the band-pass amplifier 23 is turned off, disabling the chrominance path to the demodulator channel.

Since burst elimination is accomplished by a suitable deflection pulse turning off the band-pass amplifier 23 during the burst interval, as described above, in the circuit shown the pulse has to again drive a relatively low impedance emitter circuit associated with transistor 70. Therefore, as in FIG. 2, a higher energy pulse is required but a faster decay or recovery time prevents keeping the band-pass amplifier 23 off during a portion of the next line. The circuit of FIG. 4 also provides a higher DC gain for the killer mode as the input impedance of transistor 70 is much higher then the DC impedance of the band-pass amplifier 23.

If reference is made to FIG. 5, there is shown a circuit arrangement employing the above-described techniques of FIG. 4, further showing the input connection to a killable chrominance band-pass amplifier stage 22 and ACC arrangement coupled to the input to a gain controllable chrominance amplifier 23.

Components therein, previously described, retain the same numerals. The base electrode of transistor 60 is coupled to the input control voltage lead from the detector through a current limiting resistor 80. Emitter bias is obtained from the resistor 81 coupling the emitter electrode of transistor 60 to a voltage source +V. The emitter electrode is also coupled to a potentiometer 82 through a resistor 83. The junction of the resistor 83 and the variable arm of potentiometer 82 is bypassed for AC by capacitor 84.

The collector electrode of transistor 60 is coupled to the base electrode of the killer transistor 70 whose collector electrode is coupled to the voltage divider comprising resistors 71 and 72. A voltage divider comprising resistors 90 and 91 at the base electrode of transistor 70 assure cutoff of this stage during monochrome reception. The emitter electrode of transistor 70 is coupled to ground through resistor 73. The emitter electrode of transistor 70 is coupled to the base electrode of a transistor 85 through a bias resistor 86. The collector circuit of the transistor 85, not shown, is a tuned collector load capable of selectively responding to signal components as is known in band-pass amplifiers. Also applied to the base electrode of the transistor band-pass amplifier 85 is the chrominance signal from the amplifier 22 and the burst eliminator pulse which is applied to the base electrode through the diode 87. A negative pulse from the deflection circuits which is of a sufficient amplitude to drive the band-pass amplifier stage 85 off, prevents the burst from passing through the band-pass amplifiers. The low output impedance of transistor 70, plus the capacitor 99 assure that this pulse will disable amplifier 85 only for the required duration and not keep the amplifier cut off curing a portion of the next television line.

As described previously ACC is taken from the emitter electrode of transistor 60 and is applied to the base electrode of transistor 65. The collector electrode of transistor 65 is coupled to a voltage divider comprising resistors 95 and 96 and to the base of chrominance amplifier transistor 97 through the current limiting resistor 98. The input signal is applied via lead 20 from the color television signal receiver (11 of FIG. 1). The collector circuit, now shown, for amplifier 97 is tuned to frequencies within the chrominance band.

A circuit as shown in FIG. 5 used the following components.

| | | |
|---|---|---|
| Resistor 65 | ohms | 1,500 |
| Resistor 67 | do | 8,200 |
| Resistor 71 | do | 6,800 |
| Resistor 72 | do | 2,700 |
| Resistor 73 | do | 56,000 |
| Resistor 80 | do | 10,000 |
| Resistor 81 | do | 15,000 |
| Resistor 82 | do | [1] 100,000 |
| Resistor 83 | do | 100,000 |
| Resistor 86 | do | 3,300 |
| Resistor 90 | Meg. ohms | 6.8 |
| Resistor 91 | ohms | 100,000 |
| Resistor 95 | do | 56,000 |
| Resistor 96 | do | 15,000 |
| Resistor 98 | do | 470 |
| Capacitor 84 | microfarads | .001 |
| Capacitor 89 | do | .01 |
| Transistor 60 | | 2N4249 |
| Transistor 65 | | 2N4249 |
| Transistor 70 | | 2N3693 |
| +Voltage | volts | +30 |

[1] Variable.

I claim:

1. In a color television receiver adapted to receive a color television signal including a burst signal of a predetermined frequency and phase and including a chrominance amplifier, the combination therewith comprising:

a. means for detecting the amplitude of said burst signal;

b. a transistor amplifier circuit having a base input electrode coupled to said means, said base input electrode being responsive to said amplitude of said burst signal, said amplifier having a first collector output electrode and a second emitter output electrode;

c. means coupled to one of said output electrodes of said amplifier circuit to cause said amplifier circuit to operate at said collector output in a first nonamplifying mode over a first range of amplitudes to provide a signal which directly follows said detected signal and in a second amplifying mode over a second different range of amplitudes of said burst signal; and d. means coupling said first and second output electrodes to said chrominance amplifier for controlling the gain thereof during said first nonamplifying mode and for rendering said chrominance amplifier inoperative during said amplifying second mode.

2. In a color television receiver adapted to receive a television signal, said television signal including intermittent color synchronizing bursts consisting of oscillatory information during prescribed intervals and having a specified phase and frequency occurring during a color transmission, said receiver including a detector for determining the amplitude of said bursts to provide a control signal indicative of said amplitude, and a chrominance channel for amplifying a selected higher frequency band of signals included in said television signal pertinent to a color transmission, the combination therewith comprising:

a. first and second transistors each having a base, collector and emitter electrode, said collector electrode of said first transistor coupled to the base electrode of said second transistor, said base electrode of said first transistor coupled to said detector and responsive to said control signal;

b. threshold means coupling the collector electrode of said second transistor to a point of reference potential to cause said second transistor to operate in a first mode for a first specified range of control signals and in a second mode for a second specified range of control signals;

c. means coupling the collector electrode of said second transistor to said chrominance channel for controlling the gain thereof in said first mode; and d. means coupling the emitter of said second transistor to said chrominance channel for rendering it inoperative in said second mode.

3. The television receiver according to claim 2 wherein said first and second transistors are opposite conductivity types.

4. In a color television receiver adapted to receive a television signal, said television signal including intermittent color-synchronizing bursts consisting of oscillatory information during prescribed intervals and having a specified phase and frequency and occurring only during a color transmission, the combination therewith comprising:

a. first means responsive to said bursts to provide a control voltage at an output thereof representative of the amplitude of said bursts;

b. a transistor amplifier circuit having a first collector electrode output and a second emitter electrode output, said amplifier having a base input electrode coupled to said output of said first means, said base input electrode being responsive to said control voltage;

c. threshold means coupled to said first collector electrode output of said amplifier to cause said amplifier to follow said control voltage in a nonamplifying mode over a first range determined by said threshold means;
d. said threshold means further causing said second emitter electrode output of said amplifier to substantially follow said control voltage over a second range;
e. a chrominance channel for processing signal information in a selected higher frequency range of said television signal;
f. means for coupling said chrominance channel to said first output of said amplifier for applying said followed control voltage over said first range to control the amplification of said color information; and
g. means for coupling said chrominance channel to said second output of said amplifier for applying said control voltage over said second range to substantially disable the amplification of said color information.

5. In a color television receiver adapted to receive a television signal, said television signal including intermittent color-synchronizing bursts consisting of oscillatory information during prescribed intervals and having a prescribed phase and frequency and occurring only during a color transmission, the combination therewith comprising;
a. first means responsive to said bursts to provide a control voltage at an output thereof representative of the amplitude of said burst signal;
b. a first transistor having a base, collector and emitter electrode, said base electrode of said first transistor coupled to said first means responsive to said control voltage;
c. means coupling said emitter electrode of said first transistor to a point of reference potential;
d. a second transistor having a base, collector and emitter electrode, said base electrode of said second transistor direct coupled to said collector electrode of said first transistor;
e. a threshold circuit including a biasing source coupled to said collector of said second transistor to cause said transistor to operate in a first mode for a first range of said control voltage and in a second mode for a second range of said control voltage;
f. a chrominance amplifier for processing signal information in a selected higher frequency range of said television signal; and
g. means for coupling said collector of said second transistor to said chrominance amplifier to control the gain thereof in said first mode and means for coupling the emitter electrode of said second transistor to said chrominance amplifier to render said chrominance amplifier inoperative in said second mode.

6. The television receiver according to claim 5 wherein the first transistor is a PNP device and the second transistor is an NPN device.

7. In a color television receiver adapted to receive a color television signal including a burst signal of a predetermined frequency and phase and also including a chrominance amplifier, the combination therewith comprising:
a. first means for detecting the amplitude of said burst signal to provide at an output a control voltage determinative of said amplitude;
b. first and second transistors each having a base, collector and emitter electrode, said base of said first transistor coupled to said output of said first means and responsive to said differences in amplitude, said emitter of said first transistor coupled to the base of said second transistor;
c. a first threshold circuit coupled to the collector of said first transistor to cause said first transistor to follow at said collector electrode said control voltage over a first range;
d. a second threshold circuit coupled to the emitter of said second transistor to cause said second transistor to follow at said emitter electrode said control voltage over a second range;
e. means for coupling said collector of said first transistor and said emitter of said second transistor to said chrominance amplifier to control the gain thereof over said second range of control voltage and to render said chrominance amplifier inoperative over said first range of control voltage.

8. The color television receiver according to claim 7 where in said first threshold circuit comprises a voltage divider including a diode having its anode coupled to the collector of said first transistor and its cathode coupled to a point on said voltage divider.

9. The color television receiver according to claim 7 wherein said first threshold circuit comprises a voltage divider including a transistor having its base electrode coupled to the collector of said first transistor and its collector electrode coupled to a point on said divider.

10. In a color television receiver adapted to receive a color television signal including a burst signal of a predetermined frequency and phase and including a chrominance amplifier, the combination therewith comprising:
a. first means for detecting the amplitude of said burst signal to provide a control voltage indicative of said amplitude;
b. a transistor amplifier circuit having a base input electrode coupled to said first means, said base input electrode being responsive to said control voltage indicative of said amplitude of said burst, said amplifier having first collector output electrode and second emitter output electrode;
c. means coupled to said collector output of said amplifier to cause said collector output of said amplifier to follow said control voltage over a first range of levels, determined by the presence of bursts of a specified amplitude, said amplifier providing at said collector output a noninverted control signal, and to cause said emitter output to follow said control voltage over a second different range of levels, also determined by the presence of bursts of a second lower amplitude; and d. means for coupling said first and second outputs to said chrominance amplifier to control the gain of said chrominance channel for the presence of bursts of said specified amplitude and to render said chrominance amplifier inoperative for said second range of voltage levels substantially corresponding to the presence of bursts of a lower second amplitude.

11. In a color television receiver adapted to receive a television signal, said television signal including intermittent color synchronizing bursts consisting of oscillatory information during prescribed time intervals and having a prescribed phase and frequency and occurring only during a color transmission, the combination therewith:
a. a detector for providing a control voltage at its output indicative of the amplitude of said color bursts;
b. first, second and third transistors each having a base, collector and emitter electrode;
c. signal coupling means coupling said base electrode of said first transistor to said output of said detector, said collector electrode of said first transistor to the base electrode of said second transistor, said emitter electrode of said first transistor to the base electrode of said third transistor;
d. first threshold means coupled to the collector electrode of said second transistor, for operating said second transistor in a first mode determined by said threshold means and first levels of said control voltage applied to said base electrode of said second transistor, and in a second mode for second control voltage levels less than said first levels;
e. second threshold means coupled to the emitter of said third transistor to operate said third transistor during said first mode to cause said third transistor to follow said first amplitudes of control voltage;
f. first and second transistor band-pass amplifier stages operative for processing color information;
g. means coupling the input of said first band-pass to said emitter electrode of said second transistor to supply a relatively constant bias thereto in said first mode and to render said first band-pass inoperative in said second mode;

h. means coupling the input of said second band-pass to the collector electrode of said third transistor to supply an operating bias thereto in said first mode which bias varies according to said first level of said control voltage for providing gain control of said second band-pass amplifier stage.